United States Patent
Chu et al.

(10) Patent No.: US 9,490,723 B2
(45) Date of Patent: Nov. 8, 2016

(54) POWER ADAPTOR SYSTEM AND METHOD

(71) Applicant: Quanta Computer Inc., Tao Yuan Shien (TW)

(72) Inventors: Tai-Hsin Chu, Taipei (TW); Yu-An Huang, Taoyuan (TW); Wei-Ting Lu, Tainan (TW); Tsung-Lin Chan, Taichung (TW); Hsin-Wei Chen, Taoyuan (TW); Chih-Kuo Hung, New Taipei (TW); Zih-Chiang Wang, Taoyuan (TW); Hung-Chang Tsai, New Taipei (TW)

(73) Assignee: QUANTA COMPUTER INC., Tao Yuan Shien (TW)

( * ) Notice: Subject to any disclaimer, the term of this patent is extended or adjusted under 35 U.S.C. 154(b) by 1034 days.

(21) Appl. No.: 13/674,001

(22) Filed: Nov. 10, 2012

(65) Prior Publication Data
US 2014/0070630 A1    Mar. 13, 2014

(30) Foreign Application Priority Data

Sep. 13, 2012  (TW) .............................. 101133507 A

(51) Int. Cl.
*H02M 7/02*  (2006.01)
*H02J 5/00*  (2016.01)
*H02J 7/00*  (2006.01)

(52) U.S. Cl.
CPC ............... *H02M 7/02* (2013.01); *H02J 5/00* (2013.01); *H02J 7/0068* (2013.01); *Y10T 307/826* (2015.04)

(58) Field of Classification Search
CPC .......... H02J 7/0068; H02J 5/00; H02M 7/07; H02M 7/02; Y10T 307/826
USPC ................................................ 307/125; 363/84
See application file for complete search history.

(56) References Cited

U.S. PATENT DOCUMENTS 4,857,820 A * 8/1989 Tompkins ............... H02J 7/022
320/161
2004/0056533 A1    3/2004 Chen

FOREIGN PATENT DOCUMENTS

| CN | 101515723 A | 8/2009 |
| CN | 102593942 A * | 7/2012 |
| TW | 533646 B | 5/2003 |
| TW | 200938001 A | 9/2009 |

OTHER PUBLICATIONS

Machine translation of CN 101515723 A; Sibai Technologies Inc., Aug. 2009.*
Taiwanese Office Action dated on Jul. 3, 2014.
Chinese Office Action dated Jun. 30, 2015.

* cited by examiner

*Primary Examiner* — Rexford Barnie
*Assistant Examiner* — Elim Ortiz
(74) *Attorney, Agent, or Firm* — Rabin & Berdo, P.C.

(57) ABSTRACT

A power adaptor system and method is provided. The adaptor system includes a system side and a power adaptor. The power adaptor method includes steps of: transforming an AC voltage to a DC voltage; the power adaptor generating a periodic signal and outputting a combined signal according to the DC voltage and the periodic signal; the system side retrieving a determination signal corresponding to the periodic signal according to the combined signal; and the system side selecting an operating mode according to the determination signal.

8 Claims, 7 Drawing Sheets

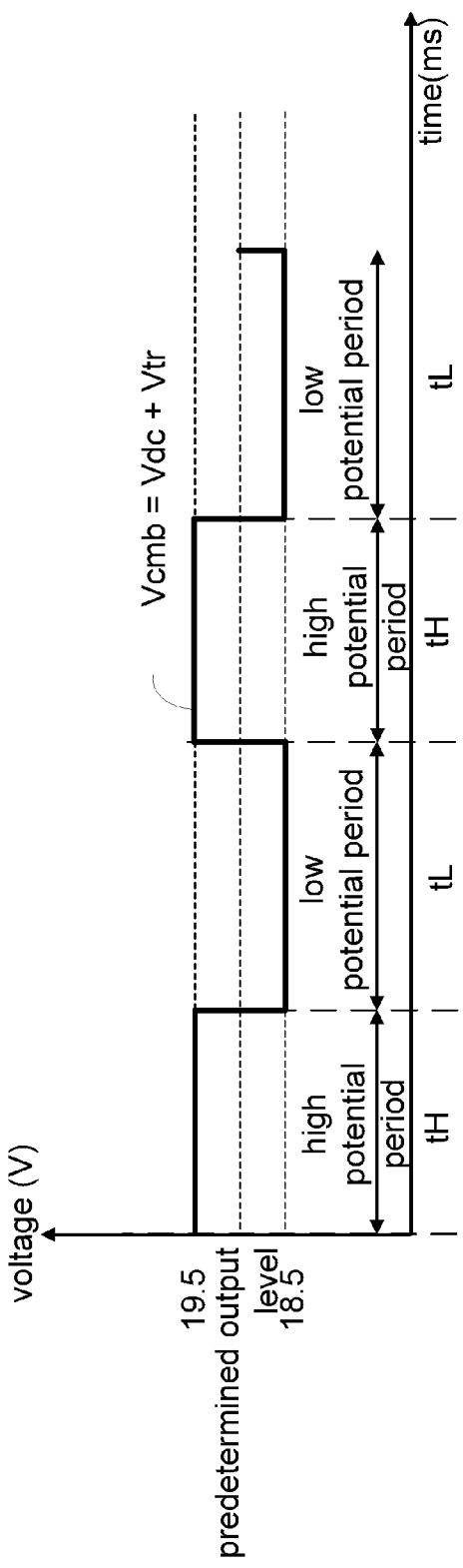
FIG. 3A
FIG. 3B
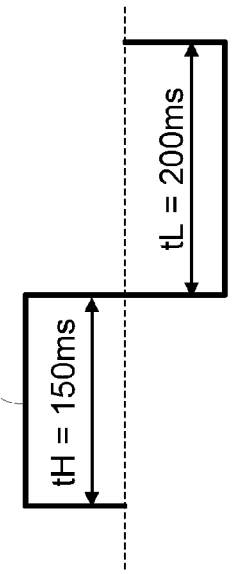
FIG. 3C

POWER ADAPTOR SYSTEM AND METHOD

This application claims the benefit of Taiwan application Serial No. 101133507, filed Sep. 13, 2012, the subject matter of which is incorporated herein by reference.

BACKGROUND OF THE INVENTION

1. Field of the Invention

The invention relates in general to a power adaptor system and method, and more particularly to a power adaptor system and method capable of selecting an operating mode.

2. Description of the Related Art

The number of market-available electronic devices with diversified functions is ever-increasing along with advancements in technology. These electronic devices not only fulfill demands of people but also prevail in the daily life to bring indispensible conveniences to life.

Among the electronic devices, laptop computers are common equipment offering both working and entertainment functions. Although a laptop computer is equipped with a battery, it is known that the amount of electricity provided by the battery is limited. When the laptop computer is under a long-term use, a transformer is required as a power adaptor side for transforming an AC voltage to a DC voltage, which is then provided to the laptop computer.

DC voltage inputted into a laptop computer has gradually developed towards a consistent value range, with most laptop computers applying a 19V DC voltage. However, computer manufacturers frequently provide an identification function using different techniques to ensure that users do not connect transformers of other manufacturers to laptop computers of a own brand. That is, a system side first identifies whether a connected transformer is provided by the same manufacturer of the laptop computer. If not, the laptop computer will not utilize electric power of the transformer produced by another manufacturer.

FIG. 1 shows a schematic diagram of transmission wires of a prior art, in which an additional conducting wire is adopted for confirming a type of a transformer. A conventional adaptor 11 has two conducting wires for respectively providing an input DC voltage Vdd and a ground voltage GND to a laptop computer 13.

To determine whether a transformer connected to the laptop computer 13 is correct, an identification function for the adaptor 11 is provided by certain manufacturers. One approach for identifying the transformer is via an identification signal Vid generated by an additional conducting wire. After reading the identification signal Vid, only when the identification signal Vid matches to an identification signal stored in the laptop computer 13, the laptop computer 13 then utilizes the power provided by the adaptor 11.

Although providing the additional conducting wire offers a function of identifying a transformer, such approach nevertheless results in a rigid and inflexible manufacturing process.

SUMMARY OF THE INVENTION

The invention is directed to a power adaptor system and method.

According to an aspect of the present invention, a power adaptor system is provided. The power adaptor system includes a power adaptor side and a system side. The power adaptor side includes: a voltage transformer circuit, for transforming an AC voltage to a DC voltage; and a signal generator, electrically connected to the voltage transformer circuit, for generating a periodic signal. The power adaptor side outputs a combined signal according to the DC voltage and the periodic signal. The system side, electrically connected to the power adaptor side, includes: a signal retrieval circuit, for retrieving a determination signal according to the combined signal; and a controller, for selecting an operating mode according to the determination signal.

According to another aspect of the present invention, a power adaptor method for a power adaptor system including a power adaptor side and a system side is provided. The power adaptor method includes steps of: the power adaptor side transforming an AC voltage to a DC voltage; the power adaptor side generating a periodic signal, and outputting a combined signal according to the DC voltage and the periodic signal; the system side retrieving a determination signal corresponding to the periodic signal according to the combined signal; and the system side selecting an operating mode according to the determination signal.

The above and other aspects of the invention will become better understood with regard to the following detailed description of the preferred but non-limiting embodiments. The following description is made with reference to the accompanying drawings.

BRIEF DESCRIPTION OF THE DRAWINGS

FIG. 3A is a schematic diagram of a signal generator outputting periodic signals according to a preferred embodiment of the present invention;

FIG. 3B is a schematic diagram of adjusting a high potential period and a low potential period of a periodic signal based on information to be provided according to a preferred embodiment of the present invention;

FIG. 3C is a schematic diagram of recording an operating mode of a system side using a predetermined table according to a preferred embodiment of the present invention;

DETAILED DESCRIPTION OF THE INVENTION

As previously stated, there is a need for a providing an identification function for a transformer (a power adaptor side) that at the same time keeps a manufacturing process of the power adaptor side simple. Apart from laptop computers, many current electronic devices also need a power adaptor side, which may also need the identification function. Therefore, although a laptop computer is taken as an example below, it should be noted that the applications of present invention are not limited to laptop computers.

Figure 1:
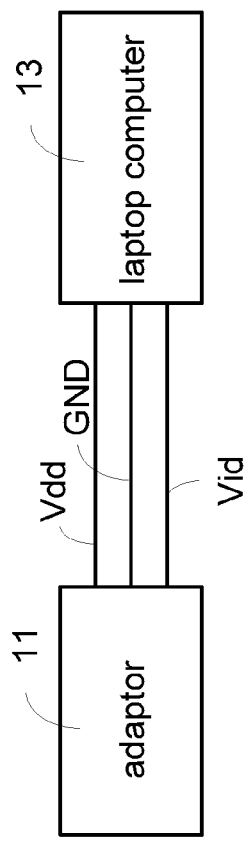
FIG. 1 (prior art) is a schematic diagram of an additional conducting wire in transmission wires adopted for confirming a type of a transformer in a prior art.
Figure 2A:
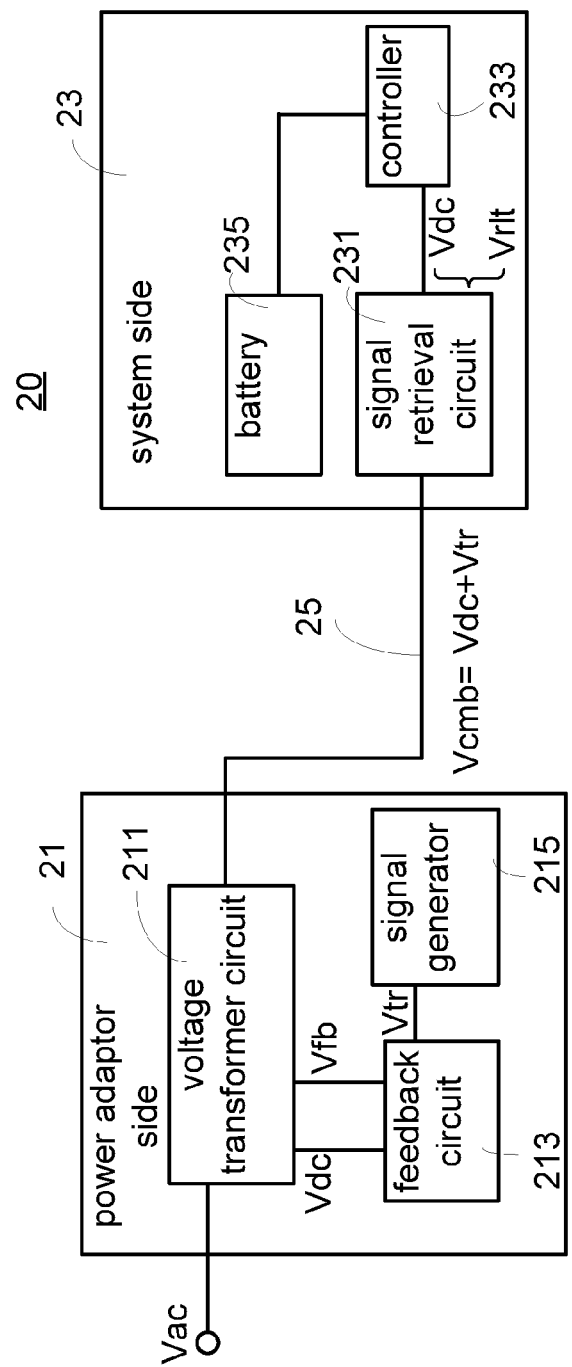
FIG. 2A is a schematic diagram of a power adaptor system according to a preferred embodiment of the present invention.

FIG. 2A shows a schematic diagram of a power adaptor system according to a preferred embodiment of the present invention. As shown, a power adaptor system 20 includes a power adaptor side 21 and a system side 23. According to a preferred embodiment of the present invention, the power adaptor side 21 outputs a combined signal Vcmb to the system side 23, which further analyzes contents represented by the combined signal Vcmb. Components of the two sides are described in detail below.

The power adaptor side 21 includes a voltage transformer circuit 211, a feedback circuit 213, and a signal generator 215. The voltage transformer circuit 211 converts an AC voltage Vac to a DC voltage Vdc. The signal generator 215 is electrically connected to the feedback circuit 213, and generates a periodic signal Vtr. Details of the periodic signal Vtr my refer to FIGS. 3A, 3B and 3C.

According to a preferred embodiment of the present invention, the combined signal Vcmb outputted by the power adaptor side 21 is substantially equal to a sum of the DC voltage Vdc and the periodic signal Vtr.

The feedback circuit 213 is electrically connected between the voltage transformer circuit 211 and the signal generator 215. According to changes of the DC voltage Vdc, the feedback circuit 213 generates and provides a feedback signal Vfb to the voltage transformer circuit 211. Therefore, the DC voltage Vdc is maintained at an ideal voltage level.

The signal generator 215 generates the periodic signal Vtr, which changes a voltage ratio of the feedback signal Vfb. After changing the voltage ratio, the feedback signal Vfb is carried to an output end of the voltage transformer circuit 211.

Details for implementing and applying the voltage transformer circuit 211 and the feedback circuit 213 are known to a person having ordinary skill in the art, and shall be omitted herein. Further, the power adaptor side may be additionally provided with an over-voltage/over-current protection circuit, and related application details shall also be omitted as being a prior art known to a person having ordinary skill in the art.

The system side 23 is electrically connected to the power adaptor side 21 via a transmission wire 25. The system side 23 includes a signal retrieval circuit 231 and a controller 233. The signal retrieval circuit 231 retrieves a determination signal Vrlt according to the combined signal Vcmb. The controller 233 selects an operating mode of the system side 23 according to the determination signal Vrlt.

The system side 23 may further include a battery 235 electrically connected to the controller 233.

It should be noted that, in a case that the system side 23 is initially not connected to the power adaptor side 21, and is thus initially powered by the battery 235. When the system side 23 is connected to the power adaptor side 21 by a user due to the battery 235 that is becoming electrically depleted or due to other reasons, the battery 235 still provides the system side 23 with required power during a signal determination period at the beginning. That is to say, the system side 23 is not immediately powered by the power adaptor side 21 when initially connected to the power adaptor side 21.

After the signal determination period, the system side 23 then becomes powered by the power adaptor side 21. Since an output power provided by the power adaptor side 21 may be different, when reading the periodic signal Vtr, the system side 23 may select different operating modes according to the output power.

Therefore, when sufficient output power is provided by the power adaptor side 21, the power adaptor side 21 also charges the battery 235 with the DC voltage Vdc in addition to powering normal operations. In contrast, when the output power of the power adaptor side 21 is only sufficient for powering normal operations of the system side 23 and falls short in charging the battery 235, the power adaptor side 21 does not charge the battery 235 with the DC voltage Vdc.

Figure 2B:
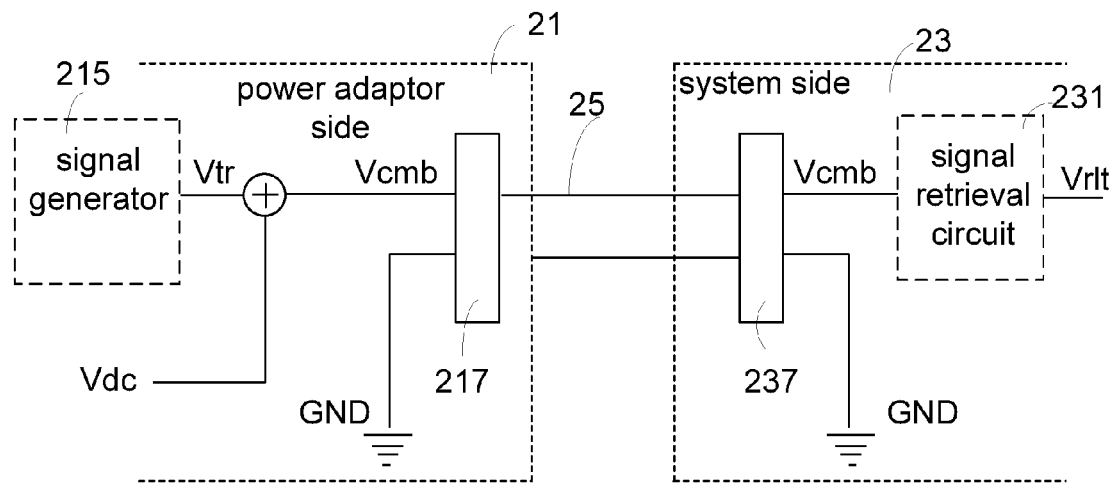
FIG. 2B is a schematic diagram of a signal generator provided at a power adaptor side and a signal retrieval circuit provided at a system side according to a preferred embodiment of the present invention.

FIG. 2B shows a schematic diagram of a signal generator provided at a power adaptor side, and a signal retrieval circuit provided at a system side according to a preferred embodiment of the present invention.

According to a preferred embodiment of the present invention, at the power adaptor side 21, the periodic signal Vtr is generated by the signal generator 215. The signal generator 215 is electrically connected to the feedback circuit 213, and changes a feedback voltage ratio in the feedback circuit 213 through the periodic signal Vtr. The periodic signal Vtr and the DC voltage Vdc generated by the voltage transformer circuit 211 are added together to generate the combined signal Vcmb.

The system side 23 is provided with a signal retrieval circuit 231. When an input terminal 237 receives the combined signal Vcmb via the transmission wire 25, the determination signal Vrlt is retrieved via the signal retrieval circuit 231.

Figure 2C:
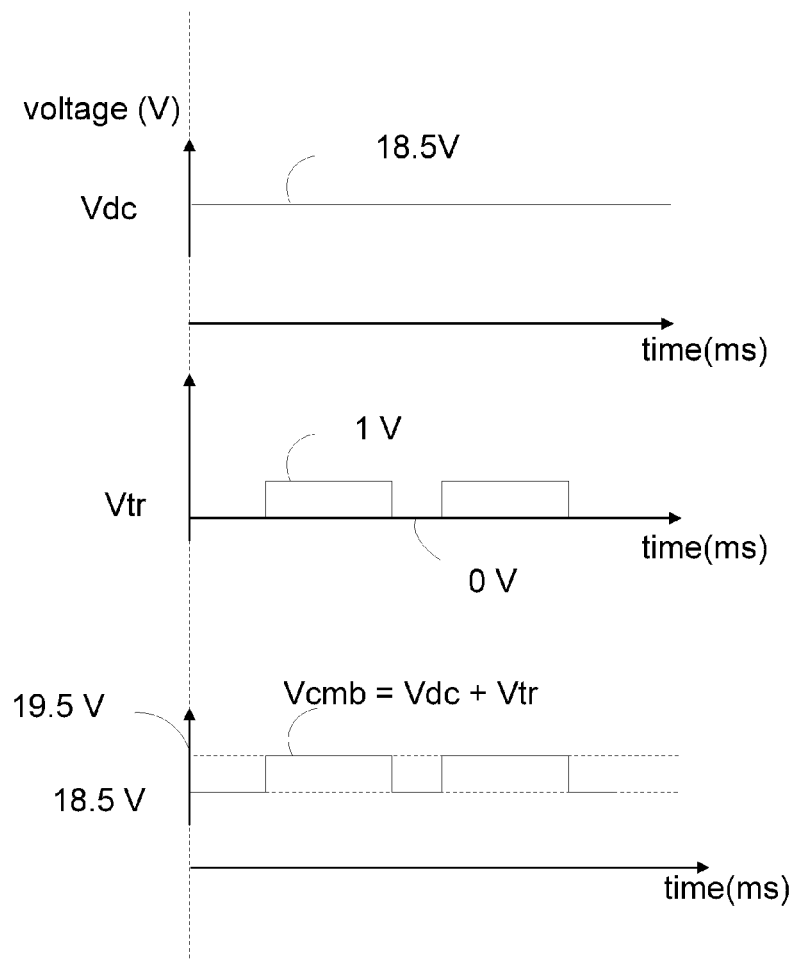
FIG. 2C is a schematic diagram of generating a combined signal according to a DC voltage and a periodic signal according to a preferred embodiment of the present invention.

FIG. 2C shows a schematic diagram of generating a combined signal according to a DC voltage and a periodic signal according to a preferred embodiment of the present invention. Three waveforms are depicted in rows from top to bottom in the diagram. The waveform at the first row represents the DC voltage Vdc having a voltage value that is perpetually maintained the same; the waveform at the second row represents the periodic signal Vtr; and the waveform at the third row represents the combined signal Vcmb.

For illustration purposes, it is assumed in FIG. 2C and in subsequent diagrams that the DC voltage Vdc is 18.5V, and a potential difference between high and low levels of the periodic signal Vtr is approximately 1V. A reason for maintaining a potential difference between a high potential level tH and a low potential level tL of the periodic signal Vtr to be smaller than the DC voltage Vdc is to prevent the potential difference from affecting operations of the DC voltage Vdc.

Thus, in FIG. 2C, a voltage of the combined signal Vcmb is between 19.5 and 18.5V. It should be noted that voltage change ranges of the DC voltage Vdc and the periodic signal Vtr may also be modified according to different applications. For example, the DC voltage Vdc is 18.8V, the voltage change range of the periodic signal Vtr is 0.4V, such that the voltage of the combined signal Vcmb is between 19.2V and 18.8V.

According to a preferred embodiment of the present invention, the signal generator 215 periodically generates the periodic signal Vtr. The periodic signals Vtr generated by the same signal generator 215 each has a high potential period tH and a low potential period tL within each period, and a length of the high potential period tH may differ from that of the low potential period tL.

FIG. 3A shows a schematic diagram of a signal generator outputting periodic signals according to a preferred embodiment of the present invention.

Since the periodic signal Vtr is outputted in a periodic manner, the system side 23 can determine that the first period of the periodic signal Vtr has ended as the high potential of the second period is read.

According to a preferred embodiment of the present invention, the high potential period tH and the low potential period tL of the periodic signal Vtr may be adjusted according to output power information, manufacturer identification information and a power connection status. Assume that the high potential period tH of the periodic signal Vtr represents the output power of the power adaptor side 21, and the low potential period tL of the periodic signal Vtr represents manufacturer information of the power adaptor side 21. Alternatively, the low potential period tL may also represent the output power of the power adaptor side 21, and the high potential period tH of the periodic signal Vtr may represent the manufacturer information of the power adaptor side 21.

Therefore, when the system side 23 is connected to different power adaptor sides 21, the system side 23 may find that the periodic signals generated by the different adaptor sides may have different high potential periods tH and low potential periods tL.

For example, when the high potential period of periodic signal Vtr is 150 ms, it is determined that the output power of the power adaptor side 21 is 150 W. Or, when the high potential period of the periodic signal Vtr is 200 ms, it is determined that the output power of the power adaptor side 21 is 200 W.

Further, when the low potential period tL of the periodic signal Vtr is 100 ms, it is determined that the power adaptor side 21 in use is made by a manufacturer A. When the low potential period tL of the periodic signal Vtr is 150 ms, it is determined that the power adaptor side 21 in use is made by a manufacturer B. When the low potential period tL of the periodic signal Vtr is 200 ms, it is determined that the power adaptor side 21 in use is made by a manufacturer C. When the low potential period tL of the periodic signal Vtr is 250 ms, it is determined that the power adaptor side 21 does not charge the battery 235.

FIG. 3B shows a schematic diagram of adjusting a high potential period and a low potential period of a periodic signal based on information to be provided according to a preferred embodiment of the present invention.

In FIG. 3B, it is assumed that the high potential period tH of the periodic signal Vtr represents the output power of the power adaptor side 21, and the low potential period tL of the periodic signal represents a manufacturer of the power adaptor side 21.

Thus, when the system side 23 reads the waveform shown in FIG. 3B, the system side 23 determines that the output power of the power adaptor side 23 is 150 W according to the 150 mS high potential period tH, and determines that the power adaptor side 23 is a power adaptor side of the manufacturer C according to the 200 ms low potential period tL. In the event that the system side 23 is an electronic device produced by the manufacturer A, when it is recognized that the power adaptor side 21 is produced by the manufacturer C according to the waveform of the periodic signal Vtr in FIG. 3B, the system side 23 alerts a user at the system side 23, or refuses to utilize the power provided by the power adaptor side 21. Therefore, the system side 23 may identify the information of the power adaptor side 21 according to the change in the waveform of the periodic signal Vtr.

According to a preferred embodiment of the present invention, the output power represented by the periodic signal Vtr further allows the system side 23 to determine a subsequent operating mode.

FIG. 3C shows a schematic diagram of recording an operating mode at a system side using a predetermined table according to a preferred embodiment of the present invention.

To keep illustrations simple, it is assumed that the high potential period of the periodic signal Vtr represents the output power of the power adaptor side 21. It should be noted that the level of the periodic signal Vtr and identification information included in the periodic signal Vtr are not limited to the described examples.

In the periodic signal Vtr, a 100 ms high potential period represents that the output power of the power adaptor side 21 is 100 W. Therefore, when the above information is recognized by the system side 23 according to the determination signal Vrlt corresponding to the periodic signal Vtr, the controller 233 controls the system side 23 to stop charging the battery 235. In such case, the DC voltage Vdc is only limited to powering basic operations of the system side 23.

In the periodic signal Vtr, a 150 ms high potential period represents that the output power of the power adaptor side 21 is 150 W. Therefore, when the above information is recognized by the system side 23 according to the determination signal Vrlt corresponding to the periodic signal Vtr, the controller 233 controls the system side 23 to operate in a lower operating speed mode.

In the periodic signal Vtr, a 200 ms high potential period represents that the output power of the power adaptor side 21 is 200 W. Therefore, when the above information is recognized by the system side 23 according to the determination signal Vrlt corresponding to the periodic signal Vtr, the controller 233 controls the system side 23 to operate in a normal operating mode, and to charge the battery 235 with the DC voltage Vdc outputted from the power adaptor side 21.

That is, the system side may in advance establish a table recording corresponding relationships between the periodic signal Vtr and the identification information. Based on the table, how the system side 23 determines its operating mode corresponding to the output powers is recorded.

For example, when the output power of the power adaptor side 21 is 50 W, a central processing unit of the system side 23 needs to down-convert to one-third of a normal operating voltage. Or, when the output power of the power adaptor side is 40 W, it is determined that the system side should stop operating.

Figure 4A:
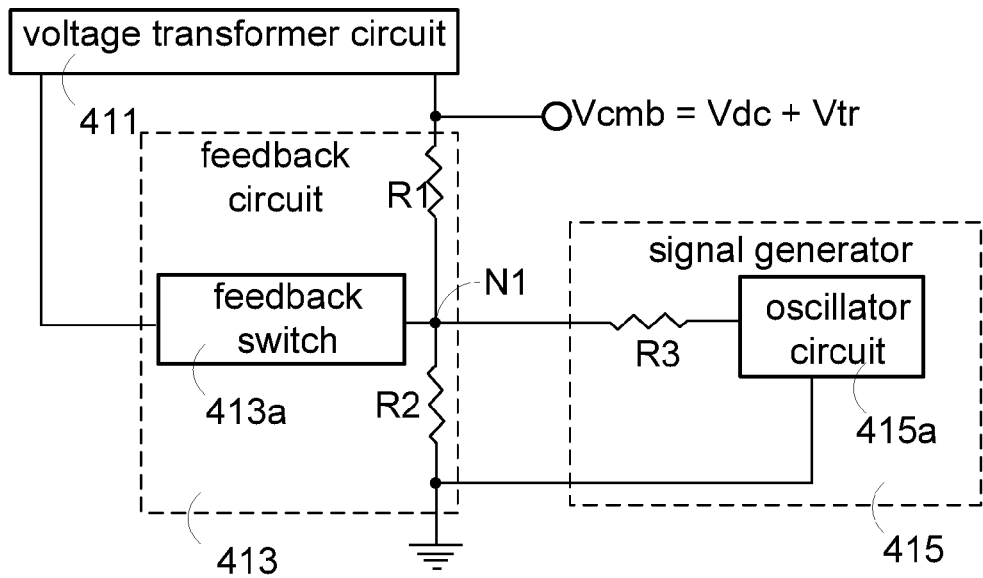
FIG. 4A is a schematic diagram of connecting a signal generator to a feedback circuit at a power adaptor side according to a preferred embodiment of the present invention.

FIG. 4A shows a schematic diagram of connecting a signal generator to a feedback circuit at a power adaptor side according to a preferred embodiment of the present invention.

The feedback circuit includes two resistors and a feedback switch, between which is a first node N1 for connecting the three. For example, when a feedback input voltage at the first node N1 is less than 2.5V, it means that the DC voltage Vdc outputted by the voltage transformer circuit 411 is slightly lower than 19V. Thus, in the subsequent voltage transformation, a DC voltage Vdc having a greater voltage value needs to be outputted to slightly pull up the original DC voltage Vdc that is lower than 19V. Designs of the feedback circuit 413 cooperating with the voltage transformer circuit 411 are not a core technique of the present invention, and shall not be further described.

A third resistor R3 in the signal generator 413 and a second resistor R2 in the feedback circuit 413 are connected in parallel. At this point, the periodic signal Vtr generated by the signal generator 415 also affects the voltage at the first node N1, such that the combined signal Vcmb outputted by the output terminal is affected as well.

Figure 4B:
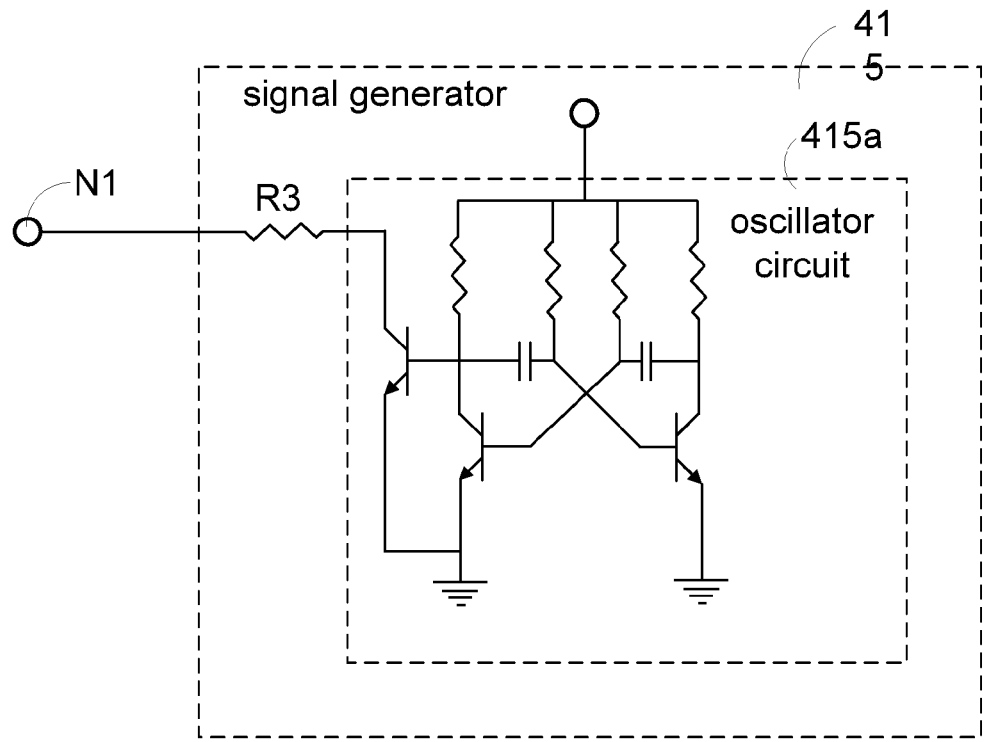
FIG. 4B is a schematic diagram of a signal generator implemented by an astable oscillator according to a preferred embodiment of the present invention.

FIG. 4B shows a schematic diagram of a signal generator implemented by an astable oscillator according to a preferred embodiment of the present invention. The oscillation circuit in the signal generator may be implemented by a bistable circuit, an oscillator or a logic chip.

Figure 5A:
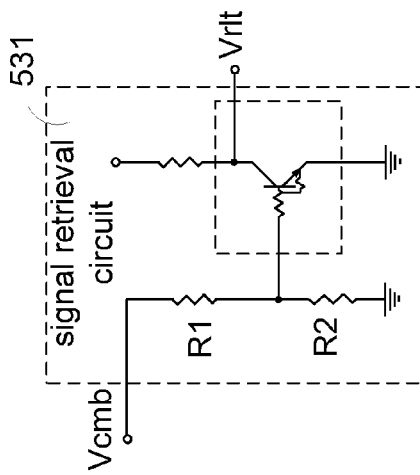
FIG. 5A is a schematic diagram of implementing a signal retrieval circuit at a system side according to a preferred embodiment of the present invention.

FIG. 5A shows a schematic diagram of implementing a signal retrieval circuit at a system side according to a preferred embodiment of the present invention. In FIG. 5A, a base of a transistor is electrically connected between two resistors. Thus, the transistor is selectively conducted according to a voltage divided result of the resistors to obtain the determination signal Vt.

Figure 5B:
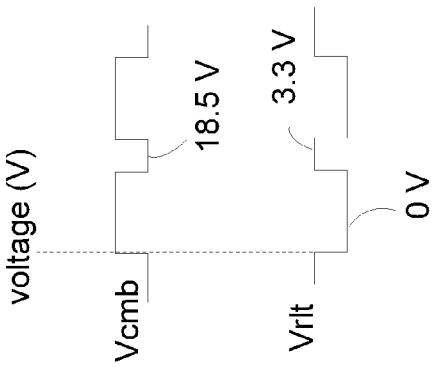
FIG. 5B is a schematic diagram of comparing a combined signal and a determination signal according to the signal retrieval circuit implemented in FIG. 5A.

FIG. 5B shows a schematic diagram of comparing a combined signal and a determination signal according to the signal retrieval circuit implemented in FIG. 5A.

The first row represents the combined signal Vcmb received by the signal retrieval circuit, and the combined signal Vcmb is voltage divided by a first resistor R1 and a second resistor R2. The first resistor R1 and the second resistor R2 are electrically connected to the transistor, and generate the determination signal Vrlt as shown in the second row. As the determination signal Vrlt is to be provided to the controller for subsequent processes, the determination signal Vrlt ranges between 0V and 3.3V.

When the combined signal Vcmb is at a relatively high potential, the voltage divided result is also at a relatively high potential, such that the base of the transistor is at a relatively high potential. At this point, the transistor is conducted so that the determination signal Vrlt is 0V (a first determination voltage).

When the combined signal Vcmb is at a relatively low potential, the voltage divided result is also at a relatively high potential, such that the base of the transistor is at a relatively low potential. At this point, the transistor is not conducted so that the determination signal Vrlt is 3.3V (a second determination voltage).

Figure 6A:
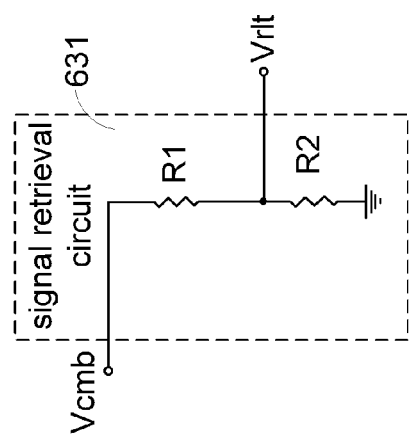
FIG. 6A is a schematic diagram of implementing a signal retrieval circuit at a system side according to another preferred embodiment of the present invention.

FIG. 6A shows a schematic diagram of implementing a signal retrieval circuit at a system side according to another preferred embodiment of the present invention. The approach in FIG. 6A can be implemented using only resistors, and the voltage obtained is in an analog format. In such case, an analog-to-digital converter (ADC) is used by the controller, for retrieving signals in analog format. This approach is relatively low cost as only resistors are needed.

Figure 6B:
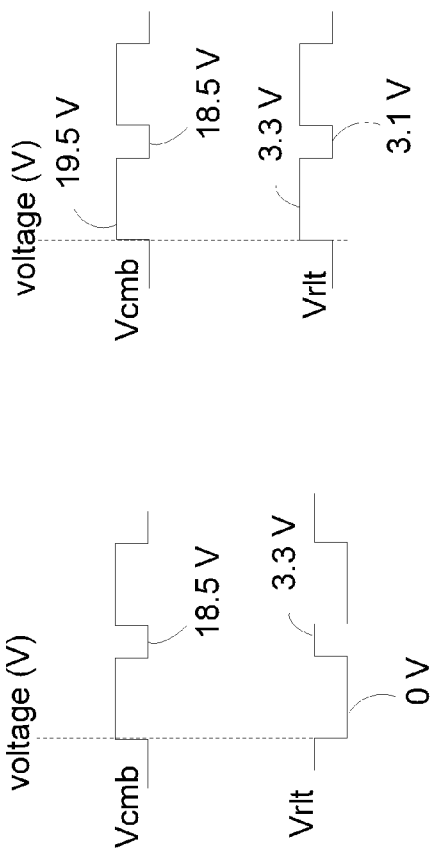
FIG. 6B is a schematic diagram of comparing a combined signal and a determination signal according to the signal retrieval circuit implemented in FIG. 6A.

FIG. 6B shows a schematic diagram of comparing a combined signal and a determination signal according to the signal retrieval circuit implemented in FIG. 6A. The first row represents the combined signal Vcmb received by the signal retrieval circuit, and the combined signal Vcmb is divided by the first resistor R1 and the second resistor R2 to obtain the determination signal Vrlt as shown in the second row. After being divided by the first resistor R1 and the second resistor R2, the voltage difference originally ranging between 19.5V and 18.5V is changed to between 3.3V and 3.1V.

Since the combined signal Vcmb is substantially equal to the sum of the DC voltage Vdc and the periodic signal Vtr, and the DC voltage Vdc does not change, phase changes of the combined signal Vcmb and the periodic signal Vtr are consistent.

In this preferred embodiment, the phase of the determination signal Vrlt is not changed by the resistors, and the high potential period of the periodic signal Vtr also corresponds to a high level (first determination voltage) of the determination signal Vrlt. Similarly, the low potential period of the periodic signal Vtr also corresponds to a low level (second determination voltage) of the determination signal Vrlt.

It is concluded from descriptions associated with FIGS. 5A, 5B, 6A and 6B that, the high potential period and the low potential period of the determination signal Vrlt may be the same or completely opposite to the high potential period tH and the low potential period tL of the periodic signal Vrt. However, regardless how the periodic signal Vtr corresponds to the determination signal Vrlt, the length of the high potential period tH and the log potential period tL of the periodic signal Vtr can still be used for recognizing the output power information, manufacturer identification information, or a power connection status configuration.

Therefore, the signal retrieval circuit at the system side may employ the corresponding relationship between the periodic signal Vtr and the determination signal Vrlt to obtain related information presented by the high potential period and the low potential period of the periodic signal Vtr.

Figure 7A:
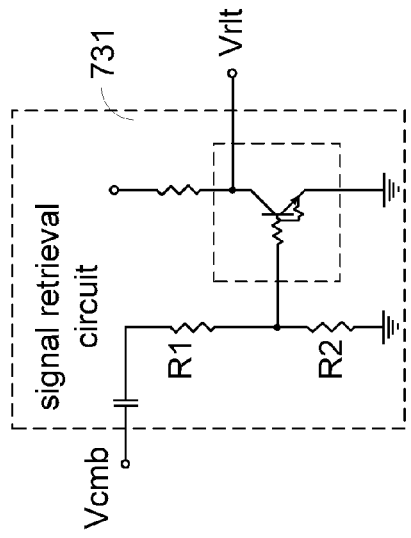
FIGS. 7A and 7B are schematic diagrams of implementing a signal retrieval circuit at a system side according to two other preferred embodiments of the present invention.
Figure 7B:
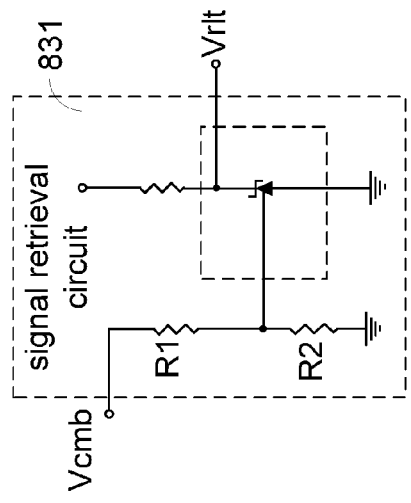

FIGS. 7A and 7B show schematic diagrams of implementing a signal retrieval circuit at a system side according to two other preferred embodiments of the present invention. As seen from the diagrams, types of the signal retrieval circuit 231 may be quite diversified.

Figure 8:
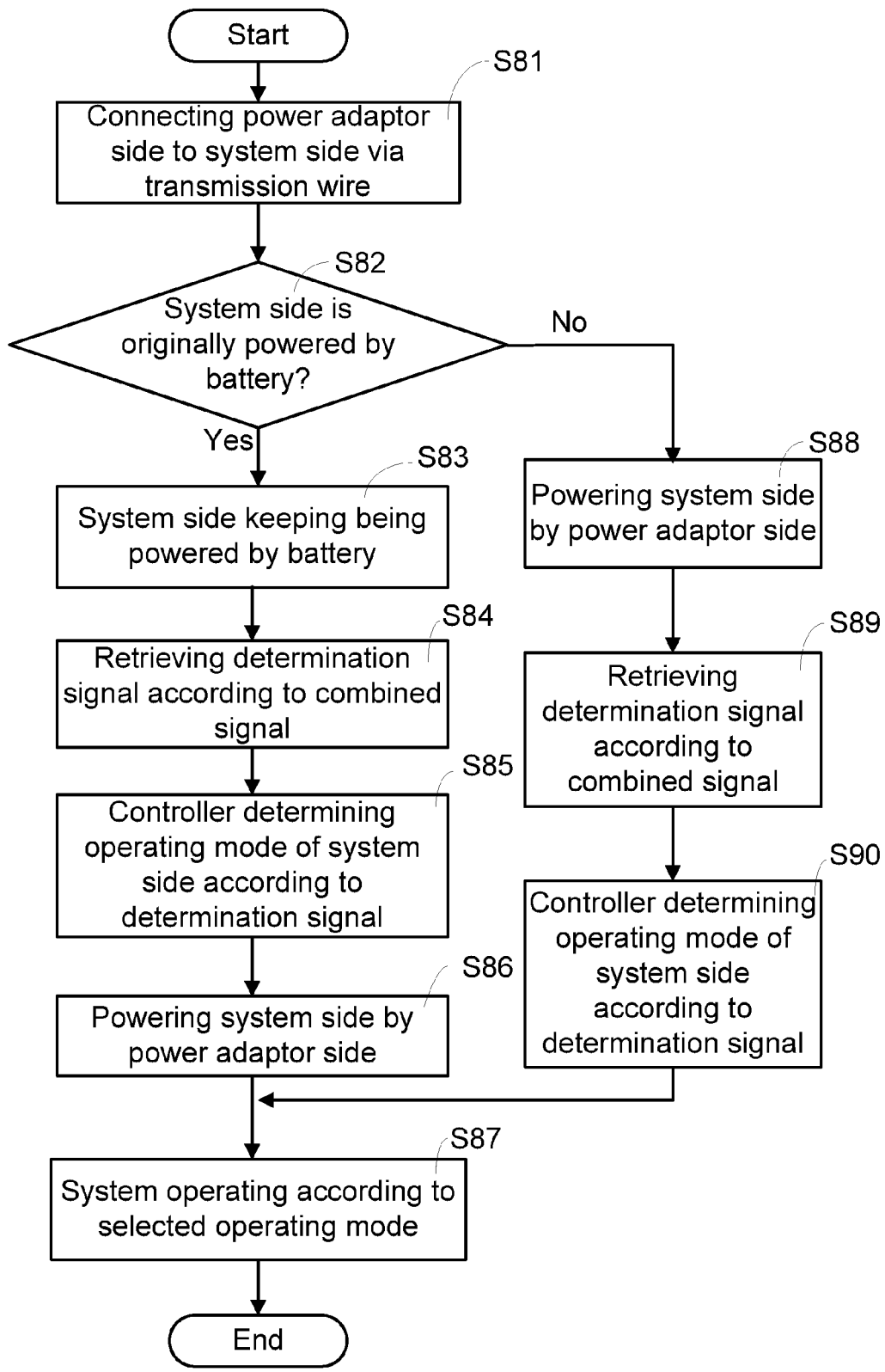
FIG. 8 is a flowchart of a process at a system side in a power adaptor method according a preferred embodiment of the present invention; and, FIG. 9 is a flowchart of a power adaptor method according a preferred embodiment of the present invention.

FIG. 8 shows a flowchart of a process at a system side in a power adaptor method according a preferred embodiment of the present invention.

In step S81, a power adaptor side is electrically connected to a system side via a transmission wire. In step S82, it is determined whether the system side is originally powered by a battery.

Steps at the left branch are proceeded if the system side is originally powered by the battery. In step S83, the system side keeps being powered by the battery. In step S84, a signal retrieval circuit is used by the system side to retrieve a determination signal according to a combined signal. In step S85, a controller of the system side determines an operating mode of the system side according to the determination signal. In step S86, the system side switches to power provided by the power adaptor side.

Steps at the right branch are proceeded if the system side is not originally powered by the battery. That is, in step S88, the system side is directly powered by the power adaptor side. In step S89, the system side retrieves the determination signal by the signal retrieval circuit according to the combined signal. In step S90, the controller determines the operating mode of the system side according to the determination signal.

In step S87, the system side operates according to the selected operating mode, e.g., activating a normal operating mode, performing down-conversion, and no longer charging the battery.

Figure 9:
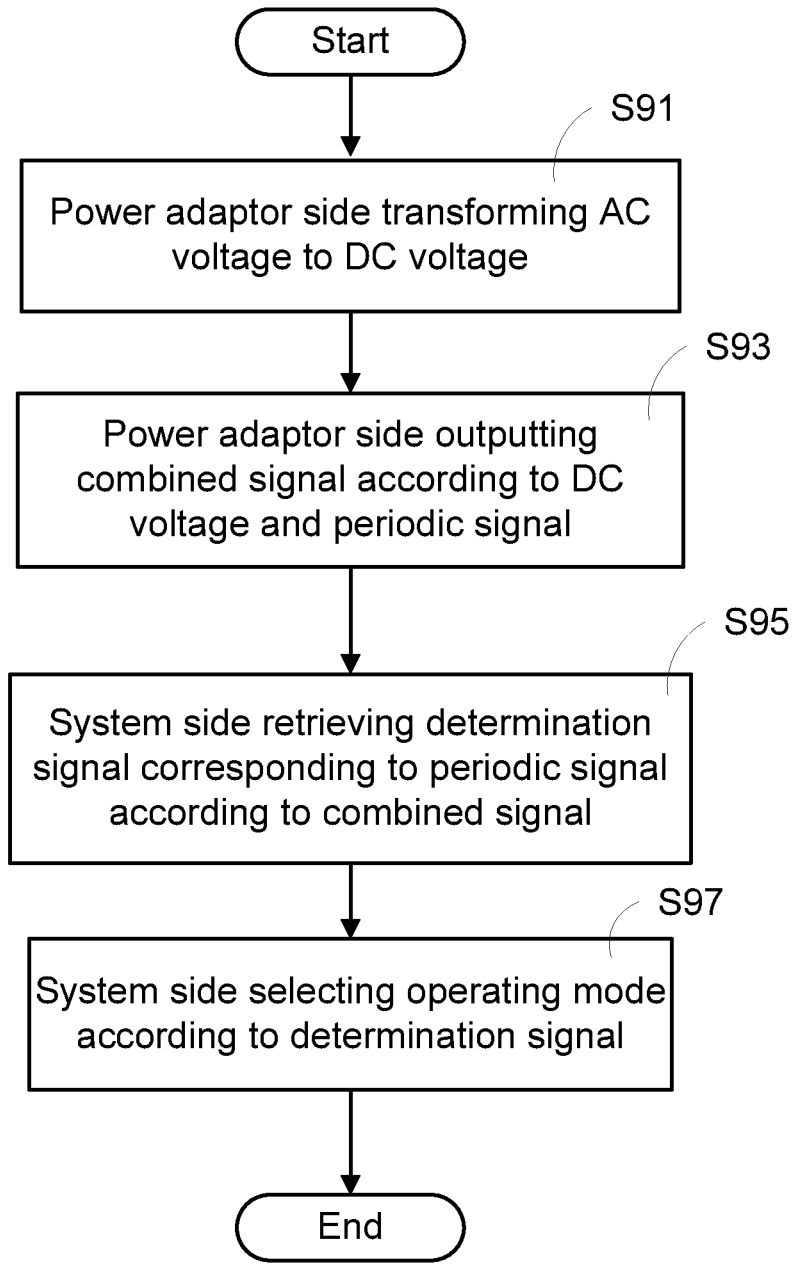

In summary, the power adaptor method applied to a power adaptor system may be represented by FIG. 9.

FIG. 9 shows a flowchart of a power adaptor method according to a preferred embodiment of the present invention. The method includes the following steps.

In step S91, the power adaptor side converts an AC voltage to a DC voltage. In step S93, the power adaptor side generates a periodic signal, and outputs a combined signal according to the DC voltage and the periodic signal. In step S95, the system side retrieves a determination signal corresponding to the periodic signal according to the combined signal. In step S97, the system side selects an operating mode according to the determination signal.

According to a preferred embodiment of the present invention, between a power adaptor side and a system side, identification information associated with the power adaptor side is carried by a voltage change in a periodic signal. On top of offering a function for identifying the power adaptor side, a transformer and the system side may further provide different variations and configurations according to details of the identification information.

In addition to fulfilling the need of providing the identification information, the power adaptor system and method do not require an additional transmission wire and is thus low in production cost. Furthermore, contents of the periodic signal Vtr can be flexibly adjusted in adaptation to different manufacturers. Hence, the provided adaptor method facilitates the manufacturing process of transformers.

It should be noted that, although a laptop computer is taken as an example in the embodiments, the same concept and principle can be applied to other types of electronic devices. For example, for electronic devices including DVD players and digital televisions that frequently involve different transformers, manufacturers of these electronic devices may also have the same requirement of identifying transformers. A main difference may be that the voltage change ranges of the DC voltage Vdc and the periodic signal Vtr can be adjusted.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power adaptor system, comprising:
   a power adaptor side, comprising:
      a voltage transformer circuit, for transforming an AC voltage to a DC voltage; and
      a signal generator, electrically connected to the voltage transformer circuit, for generating a periodic signal;
   wherein, the power adaptor side outputs a combined signal according to the DC voltage and the periodic signal; and
   a system side, comprising:
      a signal retrieval circuit, for retrieving a determination signal according to the combined signal; and
      a controller, for selecting an operating mode according to the determination signal;
   wherein the periodic signal has a high potential period and a low potential period, and the high potential period and the low potential period are adjustable according to output power information, manufacturer identification information and a power connection status configuration.

2. The power adaptor system according to claim 1, wherein the determination signal corresponds to a first determination voltage when the periodic signal is at the high potential period, and corresponds to a second determination voltage when the periodic signal is at the low potential period.

3. The power adaptor system according to claim 1, wherein a voltage difference between the high potential period and the low potential period of the periodic signal is smaller than the DC voltage.

4. The power adaptor system according to claim 1, wherein the signal generator is a bistable circuit, an oscillator or a logic chip.

5. The power adaptor system according to claim 1, wherein the system side further comprises:
   a battery, electrically connected to the controller, for providing power needed by the system side during a signal determination period,
   wherein, after the signal determination period, the system side selectively charges the battery with the DC voltage according to the operating mode.

6. A power adaptor method, applied to a power adaptor system comprising a system side and a power adaptor side, the method comprising:
   the power adaptor side transforming an AC voltage to a DC voltage;
   the power adaptor side generating a periodic signal, and outputting a combined signal according to the DC voltage and the periodic signal;
   the system side retrieving a determination signal corresponding to the periodic signal according to the combined signal; and
   the system side selecting an operating mode according to the determination signal;
   wherein the periodic signal has a high potential period and a low potential period, and the high potential period and the low potential period are adjustable according to output power information, manufacturer identification information and a power connection status configuration.

7. The power adaptor method according to claim 6, wherein a voltage difference between the high potential period and the low potential period of the periodic signal is smaller than the DC voltage; and the determination signal corresponds to a first determination voltage when the periodic signal is at the high potential period, and corresponds to a second determination voltage when the periodic signal is at the low potential period.

8. The power adaptor method according to claim 6, further comprising:
   the system side being powered by a battery in a signal determination period; and
   after the signal determination period, the system side selectively charging the battery with the DC voltage according to the operating mode.

* * * * *